Oct. 4, 1927.

H. D. HATHAWAY

DRIVING END FOR LOOMS

Filed Nov. 11, 1926

INVENTOR
HARRY D. HATHAWAY
BY
Manuel C. Rosa
ATTORNEY

Oct. 4, 1927.

H. D. HATHAWAY 1,644,374

DRIVING END FOR LOOMS

Filed Nov. 11, 1926     2 Sheets-Sheet 2

INVENTOR
HARRY D. HATHAWAY
BY
Manuel C Rosa
ATTORNEY

Patented Oct. 4, 1927.

1,644,374

UNITED STATES PATENT OFFICE.

HARRY D. HATHAWAY, OF FALL RIVER, MASSACHUSETTS.

DRIVING END FOR LOOMS.

Application filed November 11, 1926. Serial No. 147,793.

My invention relates to improvements in driving ends of the character employed with looms particularly of the Draper type.

The driving end now in use possesses several disadvantages, a few of which will be here noted. In the first place the fact that the pulley wheel is keyed directly to the crank shaft through its hub rendered it always necessary in order to dismount the pulley wheel to remove the entire crank shaft from the loom when it would be taken to the machine shop and there the pulley wheel dislodged therefrom. To accomplish this, closing down of the machinery was necessary and the warp slackened, many ends being broken during this operation. Another disadvantage inheres in that the pulley band and brake wheel are separately keyed to the crankshaft and spaced apart, an arrangement which gives rise to rocking with consequent wearing away of the crankshaft whereby it is rendered defective if not useless. Every time a shaft is removed and refitted, re-timing of the loom is made necessary which means loss of time. Although beset with these drawbacks, attempts at changing the present structure have not yet met with commercial success.

It is an object of my invention to provide a driving end for looms or allied machines wherein the pulley band, gear and brake wheel are joined to a common hub and yet are easily disassembled with little or no loss of time.

Another object of my invention is to provide a driving end for looms wherein pulleys of different diameters for varying the speed may be easily removed and applied without necessitating the removal of the crankshaft and the re-timing of the loom.

A further object of my invention is to provide a driving end wherein the pulley band and brake wheel are so disposed on the crankshaft that rocking is prevented thus saving the shaft from wearing.

A still further object of my invention is to provide a driving end wherein the use of set screws which contact with the crankshaft is eliminated.

Other objects and advantages will appear from the following detailed description.

I attain these objects by the mechanism illustrated in the accompanying drawing, in which—

Figure 1:
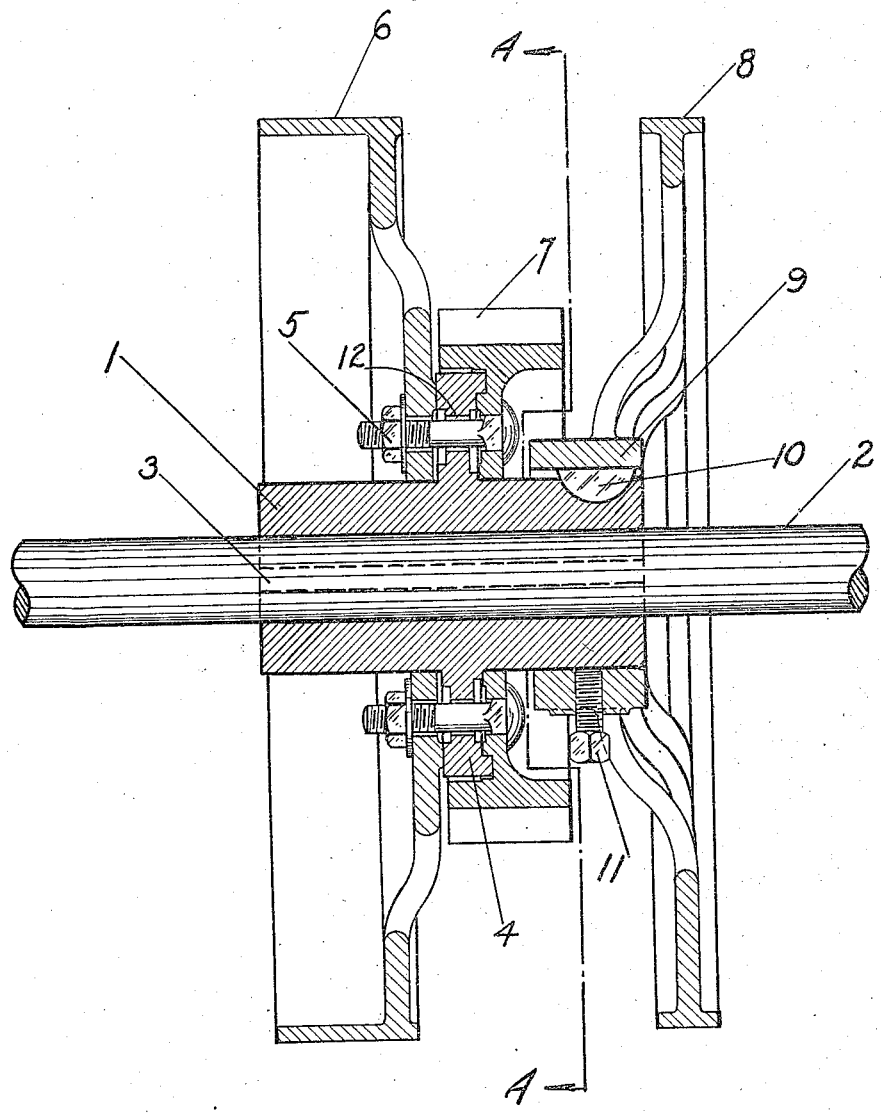
Fig. 1 is a cross-sectional view of my driving unit taken longitudinally of the crankshaft.
Figure 3:
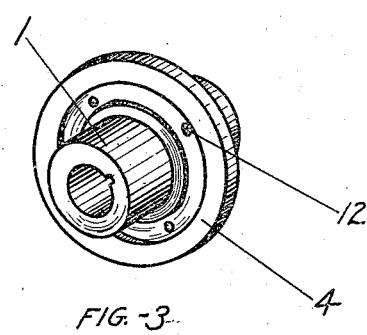
Fig. 3 is a perspective view of the hub member.

It is to be understood that the structure is to be used on a crankshaft and the disposition of a crankshaft in the loom construction being known its illustration in combination with the loom is deemed unnecessary.

In the drawings the hub 1 is mounted on the crankshaft 2. The mounting is made secure against lost motion by shrinking the hub 1 onto the shaft and a further grip is afforded by the key 3.

Figure 2:
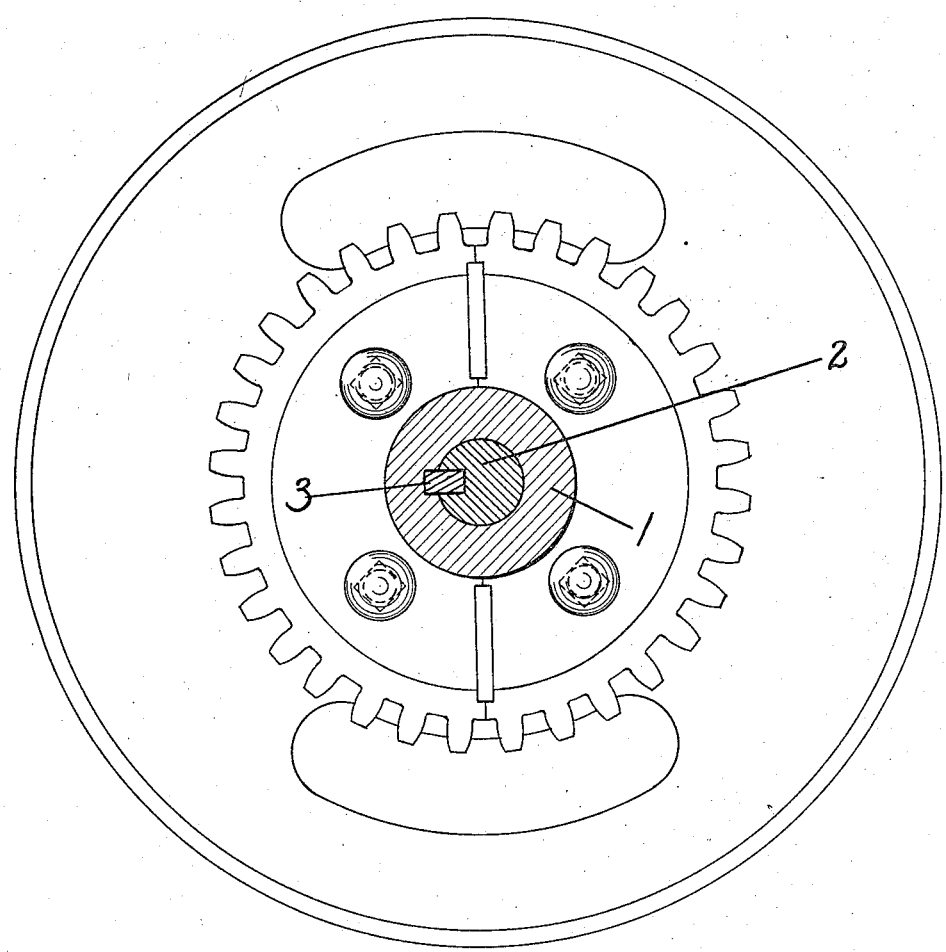
Fig. 2 is a view taken along line A—A of Fig. 1 looking in the direction of the arrows.

Integrally secured to the hub 1 is the spider member 4 positioned about midway of the length of the hub. Attached to the opposite sides of the spider 4 through the medium of the bolts 5 which pass through the openings 12 in the spider are the pulley band 6 and the split gear 7. Neither the pulley band or split gear have an enlarged hub portion and the point of securement is on the spider. It will be observed that the dismounting of the pulley band and the brake wheel may be achieved, without removing the crankshaft from the loom since these members are not keyed to the shaft. As shown with greater clarity in Fig. 2 the split gear 7 is constituted of two halves which facilitates its mounting and dismounting.

The hub 1 is of such length as to accommodate the brake or hand wheel 8 which is attached thereto through its hub 9 by means of a half moon key 10 and set screw 11.

When pulley band, split gear and brake wheel are juxtaposed as shown in Fig. 1 they are all secured to a common member which itself in turn is keyed onto the crankshaft. The danger of rocking on and wearing of the shaft as frequently occurs with the structures now in use where the pulley band and brake wheel are separately secured by their own hub members directly to the crankshaft is here avoided. The driving unit thus produced is firm, simple in structure, easily dismounted, eliminates use of set screws which contact crankshaft and is effective and reliable in operation.

The mode of operation is apparent from an inspection of the drawings there being no drastic change in the mode of operation of driving ends but rather in the construction of parts.

The material of which the hub 1 is made may be cast iron or any other suitable material.

All that has been said above in the description of my preferred embodiment is offered by way of illustration and not limitation. I do not wish to be limited to the exact structure of the preferred embodiment shown and described, or to any particular material used in the construction of parts, or to the design of parts, but desire protection as against any variations in structure which utilize the principle of my invention and fall within the purview of my invention and are within the spirit and scope of the following claim.

The invention having been set forth, what I claim as new and useful is as follows:—

In combination with a loom, a crankshaft, a driving unit on said crankshaft, said driving unit comprising a hub member having a spider member centrally disposed thereon, said spider member having a ledge on the inner side thereof, a gear member having a channel on its side contacting said spider member, said ledge being received within said channel, a pulley band, and bolt means for securing said pulley band and said gear member to said spider member, a brake wheel, said hub member being of sufficient length to accommodate the pulley band, gear member and the brake wheel.

Signed at Fall River, in the county of Bristol, State of Massachusetts, this ninth day of November, 1926.

HARRY D. HATHAWAY.